April 22, 1930.  J. M. BENJAMIN  1,755,172
MEASURING MACHINE
Filed Jan. 30, 1928
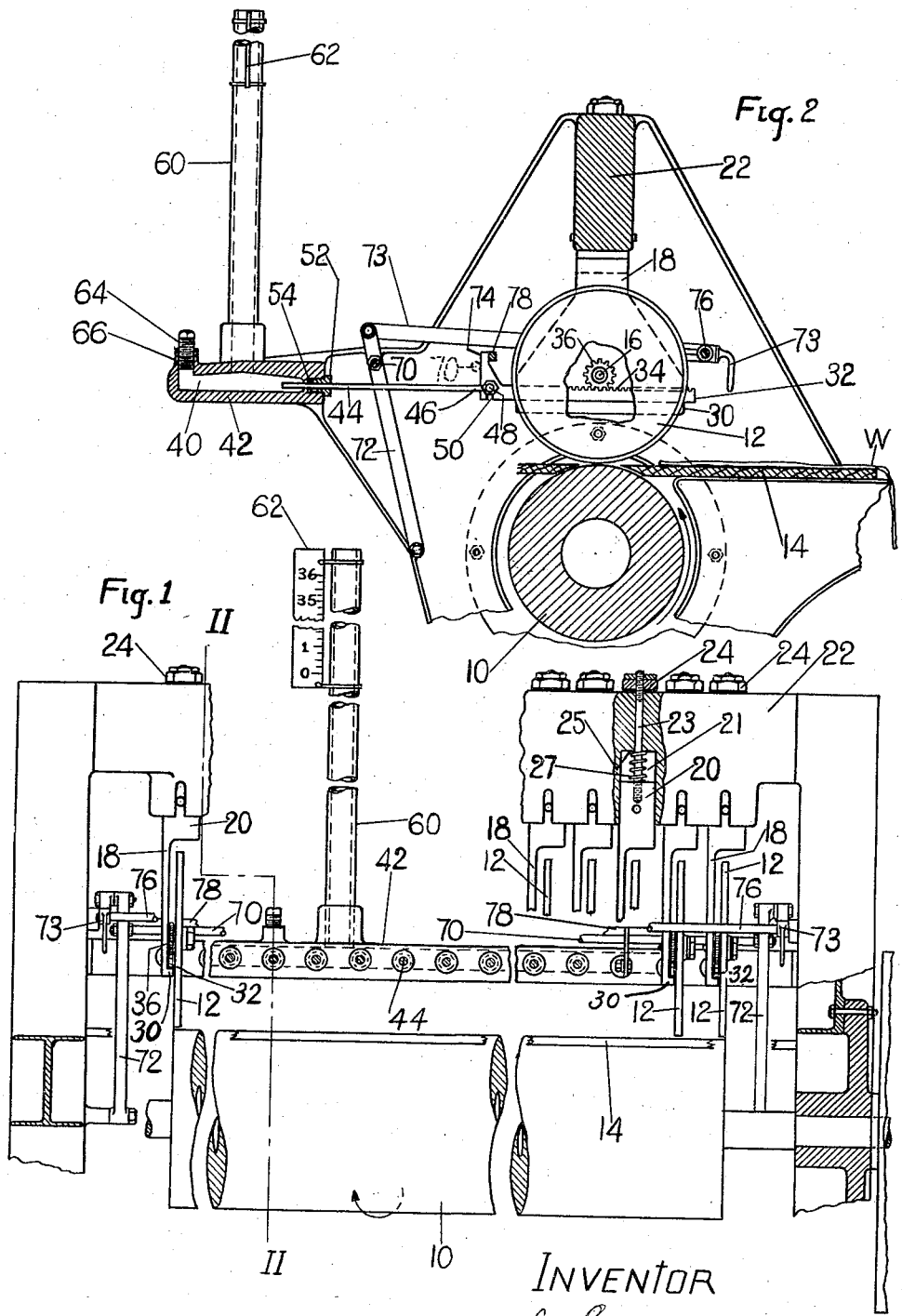
INVENTOR
John M. Benjamin
By his Attorney
Nelson B. Howard Patented Apr. 22, 1930

1,755,172

UNITED STATES PATENT OFFICE

JOHN M. BENJAMIN, OF BEVERLY, MASSACHUSETTS, ASSIGNOR TO THE TURNER TANNING MACHINERY COMPANY, OF PORTLAND, MAINE, A CORPORATION OF MAINE

MEASURING MACHINE

Application filed January 30, 1928. Serial No. 250,526.

This invention relates to measuring machines and is illustrated as embodied in a machine for measuring the surface areas of hides, skins, leather and other similar pieces of work of irregular shape.

In certain prior constructions, an enclosed body of liquid has been utilized to totalize the measuring operations of a plurality of measuring members constructed and arranged to measure the areas of irregularly shaped pieces of work such as hides and skins. In these same constructions also, the fluid has been utilized to operate an indicating mechanism whereby the totalized result is rendered visible to the operator. In such prior constructions, however, the work measuring means, including a plurality of members which contact with the work to measure it, are constructed and arranged to begin work measuring and totalizing operations as soon as the work measuring members are lifted to the upper surface of the piece work and to continue work measuring and totalizing operations at the same rate until they drop off the other end of the same piece of work, irrespective of the speed of the feeding movement of the work even if movement of the latter be entirely suspended. Hence, the area recorded by the fluid operated indicating means in such prior art constructions depends upon the length of time that a piece of work is under the measuring members and not upon the length of the path made by each measuring member upon the work during relative movement of the measuring member and the work. With such a construction it is not possible to retard some portions of the work while permitting other portions of the same piece of work to travel at the required speed of the feeding means, for the reason that the longer a given portion of the work remains under the work measuring members the greater will be the measurement recorded. It is a fact, however, that in the measurement of certain classes of work it is not only desirable but necessary that certain portions of each piece of work should be retarded to permit accurate measurement of other portions of the same piece of work. For example, a kid skin has side portions or skirts which are longer or fuller than the central portions along each side of the backbone. Hence, when a kid skin is resting on a flat surface the middle portions rest substantially in contact with the surface but the side portions or skirts, being longer or fuller, do not rest everywhere in contact with the level supporting surface but are full of pleats or folds. It follows that, when such a skin is fed to the measuring elements in an area measuring machine, it is necessary to retard the middle portions while permitting the feeding means to move the side portions or skirts at the normal rate of feeding movement of the feeding means so that the full skirt portions of the skin may be extended and properly measured. If the skin were allowed to go through the machine without retardation of the middle portions, with the result that all portions of the skin were traveling at the same rate, the folds or pleats would eventually be chased into the rear portions of the skin and then be passed under the measuring members as pleats or folds, thus rendering the measuring operation inaccurate. Also, it is a defect of the prior constructions referred to that the fluid is exposed to evaporation, or to drying and thickening in the case of oils, and to loss by undesired displacement.

It is an object of this invention to improve upon measuring machines which utilize an enclosed body of fluid as a means for totalizing the measuring operations of a plurality of members in such a way as to obviate the defects and deficiencies of such prior constructions.

To these ends, and in accordance with an important feature of the invention, an enclosed body of fluid is arranged to be acted on for totalizing the extent of movement of individually mounted measuring members which travel relatively to the work and which may be retarded without falsifying the record of the measuring operation.

In the illustrated construction, the measuring members are measuring wheels each of which is operatively connected to one of a series of members which act individually on the body of fluid to cause displacement thereof for the purposes stated. Preferably and as shown, the connection between the measuring wheel and its associated liquid-displacing member is a constant one so that displacement of fluid is directly proportional to the amount and direction of movement of the measuring wheels. Hence if the measuring wheels should even be reversed in their directions of movement, the only result would be to subtract a corresponding amount of fluid from the total theretofore displaced, so that no falsification of the record can take place. As illustrated, means is provided for returning all of the measuring wheels to initial position at the same time that the fluid displacing members are returned to initial position preliminarily to a measuring operation on a succeeding piece of work. In the illustrated construction, the members for operating upon the body of fluid are pistons which project into the fluid chamber through fluid-tight bearings, so that no fluid may escape or be exposed to the atmosphere. At one end each piston is slidably connected to a member which remains constantly in operative connection with its associated measuring wheel, the slidable connection referred to being for the purpose of maintaining a constant connection between the wheel and the piston while permitting movement of the measuring wheel in a vertical direction with respect to a work supporting surface to accommodate work of various thicknesses. Conveniently, each measuring wheel is rotatably carried in a supporting member which is vertically slidable in a stationary part of the machine frame, means being provided for adjusting the supporting member and the measuring wheel carried thereby with respect to the work supporting surface over which the work is fed during the measuring operation. For relatively thin stock the supporting member will be adjusted so that its associated measuring wheel will just clear the work supporting surface, whereas for thicker stock the supporting member will be adjusted further upwardly, not so high, however, but that the measuring wheel will be sure to engage the stock with pressure sufficient to insure its rotation as the stock is passed along over the work support.

These and other features of the invention and novel combinations of parts will now be described in detail and particularly pointed out in the appended claims.

In the drawings,

Fig. 1 is a front elevation, partly in section, of a measuring machine illustrating one embodiment of the invention; and Fig. 2 is a vertical, transverse section along the line II—II of Fig. 1.

In the illustrated surface area measuring machine there is provided a bed roll 10 which serves both as a support for hides, skins, leather, or other pieces of work during measurement thereof and also as a feeding means for moving a piece of work along beneath a plurality of work measuring members consisting of wheels 12 arranged to be rotated by work fed by the roll 10. It will be readily understood that the wheels 12 by pressing the work on the roll 10 co-operate with the roll in feeding the work. The bed roll 10 is power driven at a uniform rate of speed from a source of power not shown. It is clear that the wheels 12 are frictionally driven through contact with the work and that all or any number of them may be retarded by holding back on the work. A work supporting table 14 is provided over which a piece of work may be shoved until its forward edge engages with the bed roll 10 and one or more of the measuring wheels 12.

The measuring wheels 12 are independently supported on individual shafts 16, each wheel 12 being fixedly secured to a shaft 16, each shaft 16 being rotatably carried by a supporting member 18 which has a stem portion 20 slidably mounted in a closely fitting socket 21 in a cross bar 22 fixedly carried by the machine frame. At its upper end the stem 20 carries a rod 23 having at its upper end a nut 24 which is adjustable upon the rod to lift the supporting member 18 or to lower it and thus vary the distance of the measuring wheel 12 from the bed roll 10, this being necessary to adjust the machine for accurate measurement of different thicknesses of work. Between the stem 20 of the member 18 and an end surface 25 within the socket 21 for the stem 20 is a spring 27 which surrounds the rod 23 and serves to keep the measuring wheel normally at its lowermost position, as determined by adjustment of the nut 24, the spring 27 permitting upward yielding movement of the associated wheel, during a measuring operation in accordance with thickness variations in a piece of work. Each member 18 is provided with a guideway 30 for slidably supporting a rack bar 32 in a substantially horizontal position, the rack bar having rack teeth 34 arranged to be constantly in mesh with a pinion 36 securely attached to the shaft 16. Since the measuring wheel 12 is fixedly secured to its shaft 16, rotation of the measuring wheel will cause movement of the rack bar 32 along its guideway 30 and the amount of movement of the rack bar 32 is directly proportional to the amount of movement of the measuring wheel, so that the extent of movement of each measuring wheel in a given direction over a piece of work may be measured by the movement of its associated rack bar.

For totalizing the movements of the measuring wheels to obtain the surface area of a piece of work there is provided hydraulic means comprising a body of fluid 40 in a chamber 42 and a plurality of pistons for acting on the fluid in the chamber. Each piston 44 is slidably connected at its outer end 46 to the adjacent end of a rack bar 32 by means of a pin 48, which is slidable along a vertical slot 50 in the rack bar. Hence, movement of the measuring wheel 12 in a vertical plane does not disturb the connection between the rack bar and the piston.

It will be readily understood that as each measuring wheel 12 is progressively turned in the direction of the arrow by work fed by the roll 10 during a measuring operation on a piece of work, the rack bar 32 is moved to the left thus forcing the piston 44 further into the chamber 42 where it displaces an amount of the fluid 40 directly proportional to the stroke of the rack bar 32 and the amount of movement of the wheel in moving in one direction over the work. The piston 44 passes through a tightly fitting opening in one wall of the chamber 42, an exteriorly threaded adjustable member 52 being provided for pressing upon a bit of packing 54 to effect sealing of the opening around the piston 44, thereby preventing loss of fluid during reciprocation of the piston. When the machine is operating, the pistons 44 are moved varying distances according to the amount of travel of their associated measuring wheels so that each piston acts independently to displace a definite amount of fluid in the chamber 42 and the displacement of fluid caused by all of the pistons registers the total movement of all the measuring wheels and this without loss or magnification.

For indicating visually to the operator the displacement of fluid in the chamber 42 and, therefore, the totalized measurement of the work, there is provided visual indicating means comprising a transparent tube 60, the bore of which is of uniform diameter and communicates directly with the chamber 42 so that as the fluid 40 in the chamber is displaced by the pistons 44 it rises in the tube 60. An indicator member 62 is provided with a scale and located closely adjacent to the tube 60 so that the measurement indicated on the scale by the height of the fluid column in the tube 60 may be readily ascertained by reference to the scale. Hence, the hydraulic means not only totalizes the movement of the wheels but indicates the total measurement obtained by the wheels. The indicator member 62 is adjusted so that the fluid in the tube 60 is at zero when all of the pistons 44 are in their initial positions of rest. In order that adjustment of the fluid with reference to the scale may be readily accomplished, when that course becomes necessary or desirable, a member 64 is provided which projects into an extension 66 of the chamber 42 so that upon adjusting the member 64 enough of the fluid may be displaced from the chamber 42 to cause the fluid to rise in the tube 60 to the zero point when the machine is at rest. In the illustrated construction, the scale on the indicator member 62 represents a range of measurements in square feet and in fractions thereof.

For returning the pistons 44 and the parts connected thereto, including the rack bars 32 and the measuring wheels 12, to their initial positions of rest after a piece of work is measured, there is provided a bar 70 supported at each end of the machine by pivoted levers 72, a handle member 73 being connected to the lever 72 for drawing the bar 70 toward the right in Fig. 2 so that it engages with a shoulder 74 upon each rack bar to move all of the rack bars to the right, returning them each to the same initial position. When this has been accomplished, the slide member 70 is manually moved back to its initial position where it will not obstruct operative movement of any of the pistons and rack bars. As a matter of convenience to the operator, two handle members 73 are provided, connected respectively to levers 72 at the ends of the machine, and a hand bar 76 is extended between the handle members 73 at their front ends to extend across the front of the machine, thus enabling the operator to operate the bar 70 irrespective of his position at the front of the machine. For limiting the return movement of the rack bars and determining their initial positions, a stop bar 78 is provided as clearly shown in Fig. 2. With this stop bar all the rack bars contact when in their initial positions of rest.

In operating the machine illustrated in the drawings, a piece of work W is shoved over the table 14 until its forward edge is engaged by the bed roll 10 and one or more of the measuring wheels 12. The operator then gives his attention to smoothing out the work upon the table 14 while it is being fed in by the bed roll 10 and the measuring wheels 12 which co-operate therewith as feeding means. Each measuring wheel 12 continues to move in the direction of the arrow so long as it contacts with the moving work, and its movement is transmitted through the pinion 36 and the rack bar 32 to its associated piston 44. The latter displaces fluid from the chamber 42 in an amount directly proportionally to the amount of movement of the wheel 12. In certain classes of work it is necessary to retard the middle or backbone portions of each piece of work while the side or skirt portions move at the normal rate of speed of the bed roll 10. In thus retarding certain of the measuring wheels no error is produced for the reason that the associated pistons 44, which are positively connected to the measuring wheels, move at a corresponding rate and stop when the measuring wheels stop. Indeed, if a measuring wheel should be reversed in its movement at some intermediate portion of its path, the associated piston would also be reversed and would thus subtract, from the amount of fluid displaced up to any given instant, an amount of fluid corresponding to the reverse movement of the measuring wheel beginning at that instant. The amount of movement of all of the pistons 44 is totalized through the displacement of the fluid in the chamber 42 and this displacement is indicated through the measurement of the column of fluid in the transparent tube 60 by the aid of the indicator scale 62. It will be understood that the arrangement of the scale and the units thereof will be arrived at through tests of the machine by test sheets of known area.

Having described my invention, what I claim as new and desire to secure by Letters Patent is:

1. In a measuring machine, a support for a piece of work, a plurality of independently movable measuring members for engaging a piece of work on the support, each measuring member being continuously moved through frictional contact with the work to measure a length dimension of the work during relative movement of the member and the piece of work, an enclosed body of fluid, means operated by each measuring member to act on the fluid to cause displacement thereof in accordance with the extent of movement of the measuring member, and means controlled by the fluid displacement to indicate the total work measurement effected by the measuring members.

2. In a measuring machine, a support for a piece of work, a plurality of independently movable measuring members for engaging work on the support, each measuring member being operative to measure a length dimension of the work during relative movement of the member and the piece of work, an enclosed body of fluid, and means operated by each measuring member to cause displacement of fluid in accordance with the extent of movement of the measuring member, the total displacement caused by all of the measuring members indicating the measurement of the piece of work.

3. In a measuring machine, a support for a piece of work, a plurality of independently movable measuring members for engaging a piece of work on the support, each measuring member being driven by frictional contact with the moving work to measure a length dimension of the work during relative movement of the member and the piece of work, a plurality of pistons, each arranged to be moved by an associated measuring member, and an enclosed body of fluid arranged to be acted upon by the pistons to totalize the movements of the pistons and to indicate by the total displacement of fluid the measurement of the piece of work.

4. In an area measuring machine, a support for a piece of work, a plurality of independently rotatable measuring members for engaging work on the support, each measuring member being rotated by frictional contact with the work to effect measurement of a length dimension of the work during relative movement of the member and the piece of work, a chamber containing a fluid, means operated by each work measuring member for displacing fluid in the chamber in accordance with the amount of rotation of the measuring member, and means for indicating the total amount of fluid displaced, thereby indicating also the total work measurement effected by the measuring members.

5. In a measuring machine, a support for a piece of work, a rotatable member for engaging work on the support, the rotatable member being operated through friction with the work to measure a dimension thereof, a chamber containing fluid, means operated by the work measuring member for displacing fluid in the chamber, a tube having a bore communicating with the chamber for receiving fluid displaced from the chamber, means associated with the tube for measuring the amount of displacement indicated by the fluid, and means for simultaneously returning the measuring member and the fluid displacing means to their initial positions.

6. In an area measuring machine, a support for a piece of work to be measured, a plurality of movable measuring members for engaging a piece of work, each measuring member being operative to effect measurement of a length dimension of the work during relative movement of the member and the piece of work, a chamber containing a fluid, means controlled by each measuring member to displace fluid in the chamber in proportion to the extent of movement of its associated measuring member, whereby the movements of the measuring members are totalized by the fluid, and means for indicating the total displacement of the fluid in the chamber, thereby indicating also the total work measurement effected by the measuring members.

7. In an area measuring machine, a support for a piece of work to be measured, a plurality of measuring members for engaging a piece of work and movable to measure distances on the surface thereof, a chamber containing a fluid, a like number of members each of which is connected to one of the measuring members and is controlled thereby to displace fluid in the chamber in accordance with the extent of measuring movement of its associated measuring member, and means for visually indicating the total displacement of the fluid from the chamber, thereby indicating also the total work measurement effected by the measuring members.

8. In an area measuring machine, a support for a piece of work to be measured, a plurality of movable measuring members for engaging a piece of work to measure distances on the surface thereof, a chamber containing a fluid, members connected respectively to the several measuring members and controlled individually thereby to displace fluid in the chamber in accordance with the extent of movements of the measuring members, and means controlled by the fluid for indicating the total amount of displacement of the fluid from the chamber.

9. In an area measuring machine, a support for a piece of work to be measured, a plurality of independently movable measuring members for engaging a piece of work to measure distances on the surface thereof, a chamber containing a fluid, a like number of members each of which is connected to one of the measuring members and is controlled thereby to displace fluid in the chamber in accordance with the extent of measuring movement of its associated measuring member, and means comprising an indicator for measuring and indicating visually the total displacement of fluid from the chamber.

10. In an area measuring machine, a support for a piece of work to be measured, a plurality of independently movable measuring members for engaging a piece of work to measure distances on the surface thereof, a chamber containing a fluid, a like number of members each of which is connected to one of the measuring members and is controlled thereby to displace fluid in the chamber in accordance with the extent of measuring movement of its associated measuring member, a hollow member within which fluid displaced from the chamber may rise in a column, and an indicator for measuring and indicating visually the height of the fluid in the column.

11. In a measuring machine, a support for a piece of work to be measured, a plurality of independently movable measuring members for engaing a piece of work, a chamber containing a fluid, means connected to each measuring member and controlled individually thereby to displace fluid in the chamber in accordance with the extent of movement of its associated measuring member, and a transparent tube having a bore communicating with the fluid in the chamber so as to receive fluid displaced from the chamber, an indicator being provided in association with the tube to measure the displacement of the fluid from the chamber.

12. In an area measuring machine, a support for a piece of work to be measured, a movable work measuring member arranged to be moved continuously while in engagement with a piece of work, said measuring member being operative to effect measurement of a length dimension of the work during relative movement of the member and the piece of work, a fluid-containing chamber, a piston for causing displacement of fluid in the chamber, connections between the measuring member and the fluid-displacing piston to move the latter in accordance with the extent of movement of the measuring member, and means for indicating the displacement of the fluid from the chamber.

13. In a measuring machine, a support for a piece of work to be measured, a plurality of movable measuring members for engaging a piece of work, a chamber containing a fluid, means connected to each measuring member and controlled individually thereby to displace fluid in the chamber in accordance with the extent of the movement of its associated measuring member, and a tube having a uniform bore communicating with the fluid in the chamber so as to receive fluid displaced from the chamber and maintain it in a column, and an indicator member provided with a scale, representing a range of measurements in square feet and fractions thereof, and located adjacent to the tube to measure the height of the column and thereby indicate measurement of the piece of work.

14. In an area measuring machine, a support for a piece of work to be measured, movable work measuring members for engagement with a piece of work arranged to continue in movement while the work is passing over the support, said measuring members being operative to effect measurement of the surface area of the piece of work during relative movement of the members and the piece of work, a fluid-containing chamber, a plurality of pistons operated individually by the measuring members for displacing fluid in the chamber in accordance with the total amount of movement of the measuring members, and means for indicating the total amount of displacement of fluid from the chamber, thereby indicating also the surface area measurement effected by the measuring members.

15. In an area measuring machine, a support for a piece of work to be measured, a movable work measuring member for engagement with a piece of work to be measured, said measuring member being operative to effect measurement of a length dimension of the work during relative movement of the member and the piece of work, a fluid-containing chamber, a piston controlled by the measuring member for displacing fluid in the chamber in proportion to the amount of movement of the measuring member, means for indicating the amount of said displacement of the fluid, and means connecting the measuring member and piston and operative to cause both to be returned together to initial position.

16. In a measuring machine, a support for a piece of work to be measured, a movable work measuring wheel for engagement with a piece of work to be measured, a fluid-containing chamber, a piston movable into the chamber to displace fluid therein, a member arranged to be moved by the measuring wheel and connected to the piston to control the movements of the latter directly in proportion to the amount of movement of the measuring wheel, and means for indicating displacement of the fluid in the chamber.

17. In a measuring machine, a support for a piece of work to be measured, a movable work measuring member for engagement with a piece of work to be measured, a fluid-containing chamber, a piston movable in the chamber for displacing fluid therein, a rack bar, a pinion meshing with the rack bar, said pinion being controlled by the measuring member to move in accordance with the amount of movement of the measuring member, a connection between the rack bar and the piston so that upon movement of the measuring member the piston is caused to displace fluid in the chamber, and means for indicating the displacement of fluid in the chamber.

18. In a machine for measuring the areas of hides, skins, leather, and other similar pieces of work, a support for a piece of work to be measured, a measuring wheel adapted to engage work on the support, a fluid-containing chamber, a member for displacing fluid in the chamber, connections between the measuring wheel and said member for operating the latter in accordance with the amount of movement of the measuring wheel during movement of the work over the support, and means for indicating displacement of fluid in the chamber, thereby indicating also the total work measurement effected by the measuring members.

19. In an area measuring machine, a support for a piece of work to be measured, a plurality of independent measuring wheels for engaging a piece of work, a fluid-containing chamber, a plurality of members movable for displacing fluid in the chamber, each member being connected individually for operation by one of the measuring wheels, and means for indicating displacement of the fluid in the chamber, thereby indicating also the total work measurement effected by the measuring members.

20. In an area measuring machine, a support for a piece of work to be measured, a plurality of independent measuring wheels for engaging a piece of work, a fluid-containing chamber, a plurality of members movable for displacing fluid in the chamber, a pinion connected to each measuring wheel, a plurality of rack bars each arranged to be operated by a pinion, a connection between each rack bar and one of the fluid displacing members, and means for indicating the fluid displacement in the chamber.

21. In an area measuring machine, a support for a piece of work to be measured, a plurality of independent measuring wheels for engaging a piece of work, a fluid-containing chamber, a plurality of members movable for displacing fluid in the chamber, a pinion connected to each measuring wheel, a plurality of rack bars each arranged to be operated by a pinion, a connection between each rack bar and one of the fluid displacing members, and a tube having a bore for communicating with the fluid in the chamber so that the fluid may rise therein to indicate the amount of displacement of fluid in the chamber.

22. In an area measuring machine, a support for a piece of work to be measured, a plurality of rotatable measuring wheels for engaging a piece of work while the latter is passing over the support, means for suspending each wheel out of contact with the work support, the wheels being adjustable to work of various thicknesses, a fluid-containing chamber, a plurality of means arranged to be operated individually by rotation of the measuring wheels to displace fluid in the chamber, and means for indicating displacement of fluid in the chamber.

23. In a machine for measuring the areas of hides, skins, leather and other similar pieces of work, a support for a piece of work to be measured, a plurality of wheels rotatably and independently mounted for engagement with a piece of work as the latter passes over the work support, a fluid-containing chamber, a plurality of pistons connected individually to the measuring wheels and movable in the chamber to displace fluid therein, means for returning the wheels and pistons to initial position following a measuring operation, and means for indicating the fluid displacement with respect to the chamber.

24. In an area measuring machine, a support for a piece of work to be measured, a plurality of rotatable measuring wheels for engaging a piece of work while the latter is passing over the support, means for suspending each wheel out of contact with the work support, a fluid-containing chamber, a plurality of members arranged to be operated individually by rotation of the measuring wheels to displace fluid in the chamber, each of said members comprising a piston having a slidable connection with its associated measuring wheel constructed and arranged to cause effective connection between the piston and wheel to be maintained under all conditions, and means for indicating displacement of fluid in the chamber.

25. In a machine for measuring the areas of hides, skins, leather and other similar pieces of work, a support for a piece of work to be measured, a plurality of wheels rotatably and independently mounted for engagement with a piece of work as the latter passes over the work support, a fluid-containing chamber, a plurality of pistons movable in the chamber to displace fluid therein, a rack bar associated with each measuring wheel and movable thereby to control one of the pistons whereby each measuring wheel is caused to displace an amount of fluid proportional to its own movement, and means for indicating displacement of fluid in the chamber.

26. In a machine for measuring the areas of hides, skins, leather and other similar pieces of work, a support for a piece of work to be measured, a plurality of wheels rotatably and independently mounted for engagement with a piece of work as the latter passes over the work support, a fluid-containing chamber, a plurality of pistons movable in the chamber to displace fluid therein, each measuring wheel being arranged to control one of the pistons whereby each measuring wheel causes displacement of an amount of fluid proportional to its own movement, means for indicating displacement of the fluid in the chamber, and means for returning all of the pistons and measuring wheels simultaneously to initial position preliminarily to operation upon a succeeding piece of work.

27. In a machine for measuring the areas of hides, skins, leather and other similar pieces of work, a support for a piece of work to be measured, a plurality of wheels rotatably and independently mounted for engagement with a piece of work as the latter passes over the work support, a fluid-containing chamber, a plurality of pistons movable in the chamber to displace fluid therein, a rack bar associated with each measuring wheel and movable thereby to control one of the pistons whereby each measuring wheel is caused to displace an amount of fluid proportional to its own movement, means for indicating displacement of fluid in the chamber, and a member operable to return all of the pistons to initial position preliminarily to a measuring operation upon a succeeding piece of work.

28. In an area measuring machine, a support for a piece of work to be measured, a plurality of movable measuring members for engaging the piece of work on the support and arranged to be moved various distances by the work to measure a characteristic of the work in different portions thereof, and hydraulic means for totalizing the movements of the measuring members and for indicating the total work measurement effected by the measuring members.

29. In an area measuring machine, a support for a piece of work to be measured, a plurality of movable measuring members for engaging the piece of work on the support and arranged to be moved various distances by the work to measure a characteristic of the work in different portions thereof, a plurality of pistons each of which is connected to one of the measuring members, and hydraulic means comprising an enclosed body of fluid arranged to be acted on by the pistons to totalize the movements of the measuring members, said hydraulic means comprising also a transparent hollow tube for receiving fluid displaced by the pistons to indicate the total work measurement effected by the measuring members.

In testimony whereof I have signed my name to this specification.

JOHN M. BENJAMIN.